A. J. PARCELS.
COMBINED LOADER AND SPREADER.
APPLICATION FILED JAN. 22, 1910.
1,018,984.
Patented Feb. 27, 1912.
4 SHEETS—SHEET 1.
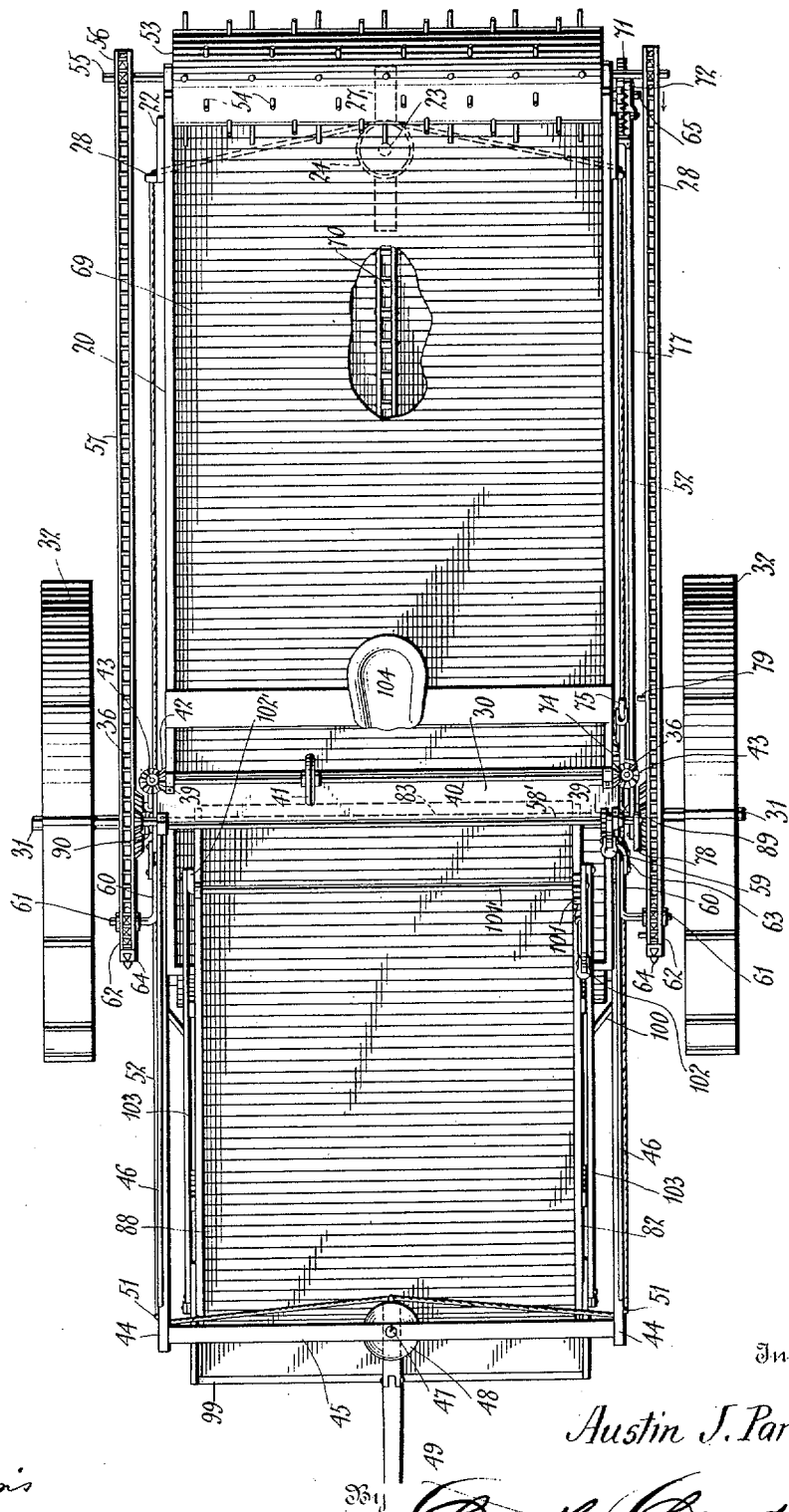
Witnesses
Inventor
Austin J. Parcels
By Chandlee & Chandlee
Attorneys

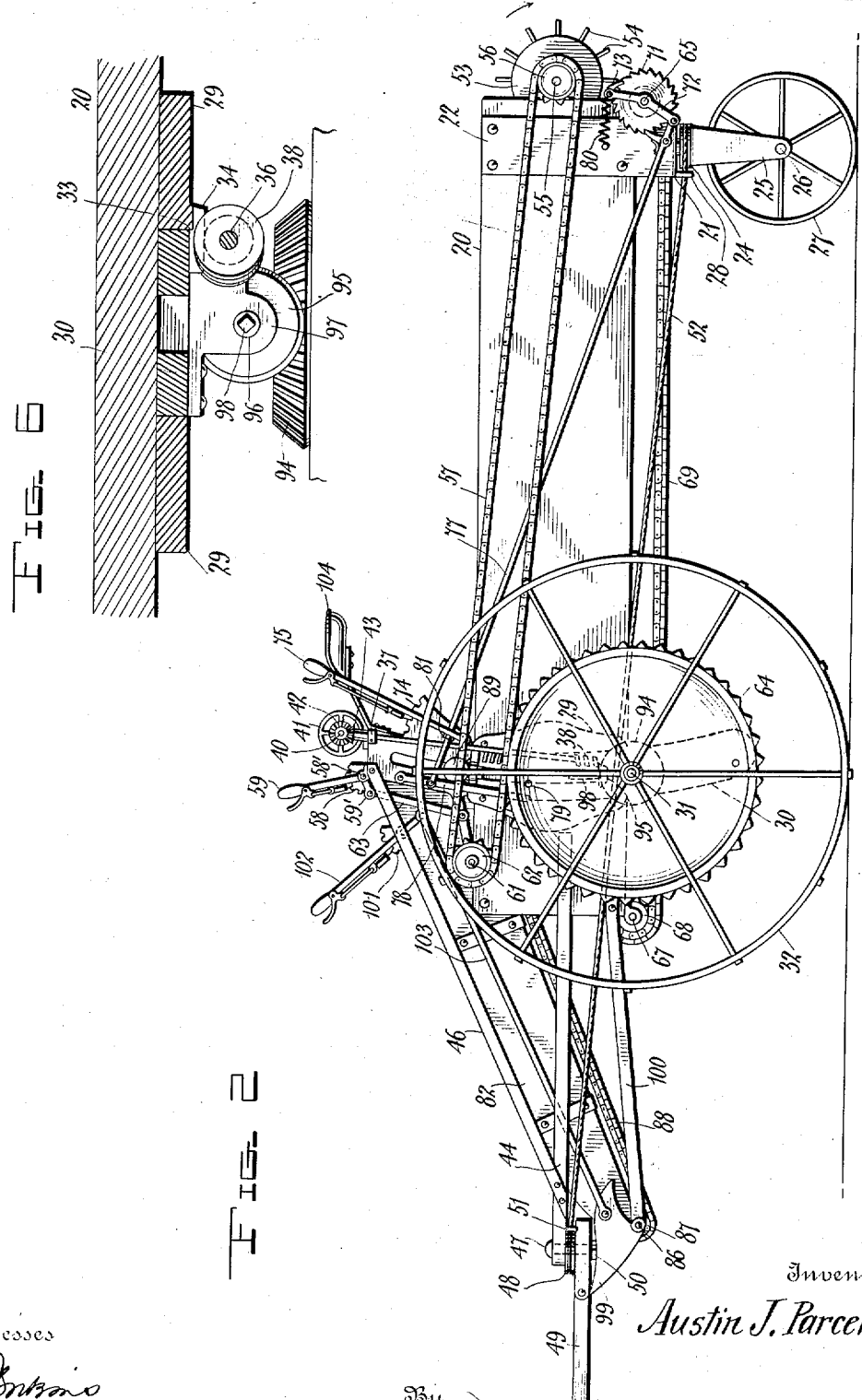

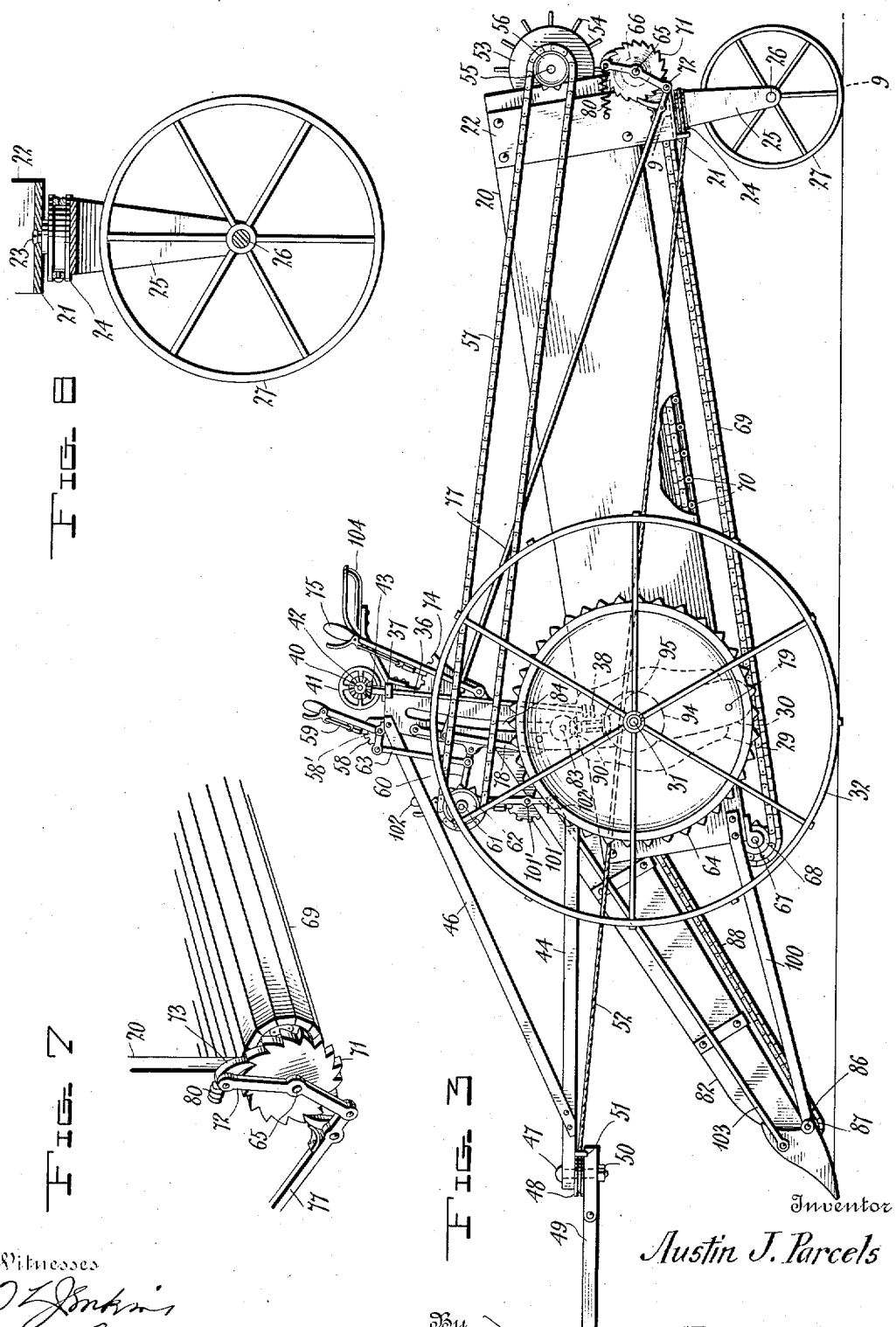

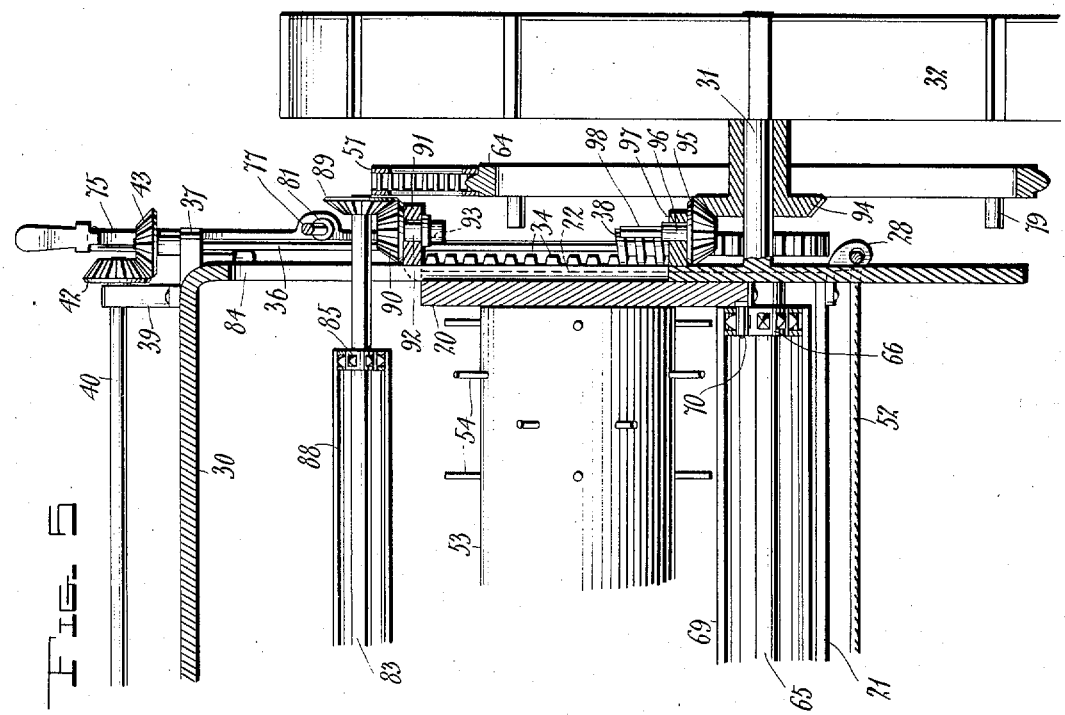
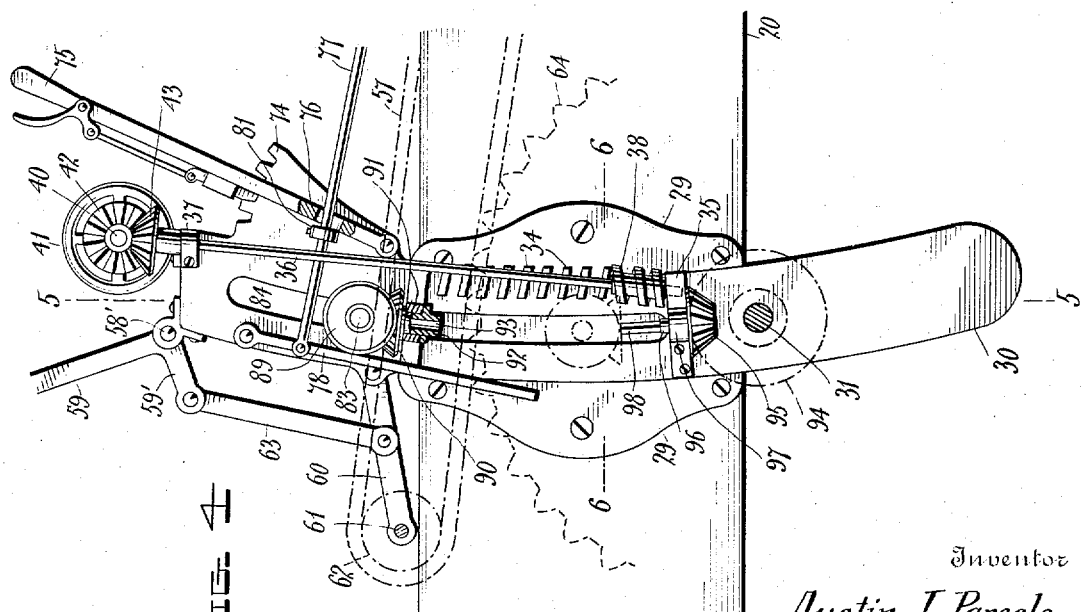

UNITED STATES PATENT OFFICE.

AUSTIN J. PARCELS, OF WETMORE, KANSAS.

COMBINED LOADER AND SPREADER.

1,018,984.     Specification of Letters Patent.     Patented Feb. 27, 1912.

Application filed January 22, 1910. Serial No. 539,487.

*To all whom it may concern:*

Be it known that I, AUSTIN J. PARCELS, a citizen of the United States, residing at Wetmore, in the county of Nemaha, State of Kansas, have invented certain new and useful Improvements in Combined Loaders and Spreaders; and I do hereby declare the following to be a full, clear, and exact description of the invention, such as will enable others skilled in the art to which it appertains to make and use the same.

This invention relates to agricultural implements and has special reference to a combined loader and spreader used for the purpose of gathering and distributing fertilizer.

One object of the invention is to provide a device of the kind described wherein the loading mechanism will be automatically thrown out of operation when transporting fertilizer or when the distributer is in use.

Another object of the invention is to provide an improved means for raising and lowering the front of a wagon body and the mechanism attached thereto.

A third object of the invention is to provide an improved form of loading mechanism.

With the above and other objects in view the invention consists in general of a wheel supported wagon body having distributing mechanism mounted thereon and being provided with loading mechanism at the front end.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a top plan view of a spreader and loader constructed in accordance with this invention. Fig. 2 is a side elevation thereof showing the parts in position for distributing fertilizer. Fig. 3 is a similar side elevation showing the parts in position for loading. Fig. 4 is an enlarged detail view of the raising and lowering mechanism and certain of the drive gears, the view being a side elevation. Fig. 5 is an enlarged partial section on the line 5—5 of Fig. 4. Fig. 6 is a greatly enlarged section on the line 6—6 of Fig. 4. Fig. 7 is a detail view showing the means whereby the movement of the distributer apron is controlled. Fig. 8 is a detail of the rear or guide wheel, the view being a section on the line 8—8 of Fig. 3.

The numeral 20 indicates the body of the device and thus is similar to an ordinary wagon body. At the rear end of this wagon body 20 is provided a bolster 21 having upwardly extending portions 22 which are securely bolted to the sides of the body 20. This bolster 21 is in spaced relation to the bottom of the wagon body. The bolster 21 is provided with a king bolt 23 whereon is mounted a sheave 24 having downwardly extending opposed arms 25. Through the lower ends of these arms passes a shaft 26 which forms the rear axle of the machine, and upon this shaft is mounted a rear wheel 27. Formed on the lower forward corners of the bolster 21 are guide eyes 28.

Adjacent the forward end of the body 20 and securely fastened to the sides thereof are guide plates 29 between which is held an arch 30. This arch 30 is substantially of U-shape and the side bars of the U embrace the wagon body 20, these bars sliding between the guides 29. Upon the lower ends of the side bars are stub shafts 31 whereon are mounted tractor wheels 32, the wheels being freely revoluble on the shafts.

In order to adjust the forward end of the wagon body and vary its height from the ground the forward portions of the guides are overlapped upon the sides of the arch 30 as indicated at 33, and rack teeth 34 are formed on these overlapped portions. Mounted on the arch 30 are bearing blocks 35 wherein are held the lower ends of the shafts 36. The upper ends of these shafts are carried in bearing blocks 37 at the upper corners of the arch. Upon the shafts 36 are worms 38 which mesh with the rack teeth 34. Upon the top of the arch 30 are bearings 39 wherein is mounted a shaft 40 provided with a hand wheel 41 located convenient to the driver. Upon each end of the shaft 40 are bevel gears 42 which mesh with bevel gears 43 mounted on the shafts 36. Now, as the arch 30 is held at a fixed height from the ground by means of the tractor wheels 32, any movement of the hand wheel 41 will cause the shaft 40 to rotate and thereby actuate the shafts 36 and their worms so that the racks will be caused to move relative to the arch 30, and the front end of the wagon will thus be raised or lowered in accordance with the direction of rotation of the hand wheel 41. As the shafts 36 will rotate in opposite directions by the arrangement of the gearing set forth, it will be obvious that the worms 38 and their rack teeth 34 will be right and left hand respectively in accordance with the side of the box on which they are located.

Extending forwardly from the sides of the arch 30 are bars 44 which are united at their forward ends by a cross bar 45 and these bars are braced to the top of the arch by suitable braces 46. The cross bar 45 is perforated at the middle to receive a king bolt 47 and held upon this king bolt is a sheave 48 which is fixedly attached to a hinged tongue 49, the king bolt passing through the tongue and being provided with the usual nut 50. At the outer ends of the cross bar 45 are guide eyes 51 and cables 52 are engaged around the sheave 48 and pass through the eyes 51 at the front of the machine. The cables thus extend to the rear and pass through the eyes 28 at this end of the machine, their terminals being engaged around the sheave 24.

It will now be seen that as the draft animals are guided to the left, the right hand cable 52 will be drawn upon and this will cause the forward portion of the wheel 27 to incline to the right. As the sheaves 48 and 24 are of uniform diameter the angle of inclination which the tongue 49 makes with the body will equal the angle to which the wheel 27 is turned. By this means the turning of the machine to one side or the other can be effected in a very small space.

Upon the rear end of the body 20 is mounted a beater 53 provided with teeth 54, the beater being carried on a shaft 55. On the ends of this shaft are sprockets 56 around which pass sprocket chains 57. Upon the arch 30 is mounted a quadrant 58 having a shaft 58′ extending therethrough and carrying a latch 59. Arms 60 are also mounted on the arch 30, the arms being pivoted thereto and being provided at their outer ends with stub shafts 61 whereon are rotatably mounted sprockets 62 over which pass the chains 57. Links 63 connect arms 59′ on the shaft 58′ with the arms 60 so that as the latch lever is moved forward the arms 60 are depressed while, when the latch lever 59 is moved to the rear, the arms will be raised. The raising and lowering of the arms 60 thus serves to raise and lower the forward portion of the chains 57. Mounted upon the wheels 32 and rotating therewith are sprocket gears 64 of such pitch as to readily mesh with the chains 57. Furthermore, these sprocket gears are of such size that when the latch lever 59 is pushed forward the lower portions or sides of the chains 57 engage on the sprocket gears while, when the latch lever is pulled backward, the chains are freed from these gears. By this means the beater may be placed in or thrown out of operation, as is desired.

In order to move the contents of the body to the rear thereof so that they may be distributed by the beater this body has mounted at the rear end thereof a shaft 65 whereon are sprockets 66. At the forward end of the body is a shaft 67 whereon are sprockets 68 and a slat conveyer 69 passes around the sprockets 66 and 68, the upper side of the conveyer constituting the floor of the body while the lower side passes under the body, this being permitted at the rear end by reason of the fact that the bolster 21 is held in spaced relation to said body. This conveyer is carried on rollers 70 held on the sides of the body and on longitudinal bars carried by said body intermediate its sides.

Upon the shaft 65 is securely fixed a ratchet wheel 71 and a lever 72 is pivoted intermediate its ends upon the shaft 65. Upon the top of this lever 72 is a pawl 73 which engages with the ratchet 71 as the lever is moved to and fro and causes the ratchet wheel to rotate, thus actuating the conveyer 69. Upon the side of the arch 30 is mounted a quadrant 74 whereon is pivoted a latch lever 75 provided with an opening 76 therethrough wherein slides a reach rod 77, the rear end of which is attached to the lever 72 at the lower end opposite the pawl 73. The forward end of this reach rod 77 is connected to a lever 78 mounted on the arch 30 on that side of the wagon body on which the lever is mounted. Formed upon the sprocket gear 64 are lugs 79 and the position of these lugs is such that the lower end of the lever 78 will be struck by these lugs, the result being that the reach rod 77 will be pulled forward as the wheels 32 rotate and the lugs strike the lever 78. In order to pull this reach rod back and permit the engagement of successive teeth by the pawl 73 there is provided a spring 80 which has one end fixed to the body 20 and the free end attached to the upper end of the lever 72. The reach rod thus receives a series of successive reciprocatory impulses. In order to control the extent of movement of this reach rod a collar 81 is positioned thereon just forward of the latch lever 75. The position of this collar is such that when the latch lever 75 is thrown to its rearmost position the lower end of the lever 78 will be in position such that it will be just engaged by the lugs 79. As one of these lugs engages this lever it moves it to the most forward position which it can assume and consequently the stroke, when the latch lever 75 is in this position, is the maximum that can be effected. If the latch lever be positioned intermediate its extreme position the spring 80 will be prevented from retracting the reach rod 77 beyond its mid-post position so that the lugs 79 will only effect a movement of the reach rod from its mid-most position to its foremost position. When the latch lever 75 is pushed to its foremost position the reach rod 77 will be carried thereby to its foremost position and the lugs 79 will not contact with the lever 78. It will now be obvious that the movement of the conveyer 69 may be increased, diminished or altogether stopped by properly positioning the latch lever 75.

At the forward end of the body 20 is mounted a trough 82 having at its upper end a shaft 83 which extends from side to side of the body 20 and passes through suitable slots 84 formed in the arch 30. Upon this shaft 83 are mounted sprocket wheels 85 and at the forward end of this trough is a shaft 86 whereon are mounted sprockets 87. A conveyer 88 passes over these sprockets and is actuated by the movement of the shaft 83. Secured upon one end of the shaft 83 is a bevel gear 89 which meshes with a bevel gear 90 carried in a bearing bracket 91 formed on the guide 29. This gear 90 has formed on the back thereof a stub shaft 92 the lower end of which is provided with a recess 93 angular in cross section. Secured to the ground wheel 32 is a bevel gear 94 which meshes with a bevel gear 95 provided with a stub shaft 96 which is supported in a bearing bracket 97 formed on the arch 30. The upper end of the stub shaft 96 is provided with a projection 98 of the same cross section as the opening 93. This projection 98 and the opening 93 are in alinement with each other so that when the forward end of the body 20 is moved to its lowermost position the projection 98 will enter the recess 93 and, as the machine moves forward and the wheels 32 revolve, the gear 94 will revolve the gear 95 and this in turn will revolve the gear 90. This latter gear will cause the gear 89 to revolve and in this manner the conveyer 88 will be actuated.

In order to gather material there is mounted upon the trough 82 a scoop 99, the scoop being pivoted on its shaft so that the same may be caused to move between the positions shown in Figs. 2 and 3. In order to support the lower end of the trough 82 and carry the weight of the scoop as well as to resist the strain incident to digging, this end of the trough 82 is firmly braced to the bottom of the body by braces 100. Upon the trough 82 is mounted a quadrant 101 and through the quadrant passes a shaft 101' carrying a latch lever 102. On the shaft 101' are arms 102' carrying links 103 which extend downward along the side of the conveyer and are attached to the sides of the scoop 99. The various latch levers and hand wheel hereinbefore referred to are all positioned convenient to the driver's seat 104 supported from the arch 30.

In the operation of the device the body is loaded by rotating the hand wheel 41 in the proper direction. The latch lever 102 is positioned so that the scoop 99 engages in the material to be loaded and the loader driven forward. At the same time the latch lever 59 is drawn backward to disengage the chains 57 from the wheels 64. The beater is thus out of service while the loading is proceeding. The material having been picked up by the scoop 99 will pass up the trough, being carried therealong by the conveyer 88, and this material will be deposited in the body. While the material is being loaded the latch lever 75 is moved to the rear of the quadrant which lets the lever 78 engage with the lugs on the tractor wheels 32. This sets the mechanism in motion causing the conveyer 69 to operate, which will carry the material as it is elevated to the rear of the box 20 so that it fills the box to the utmost capacity. When the body has been loaded the hand wheel is turned to raise the forward end and the latch lever 102 then pushed forward to raise the scoop 99. The latch lever 75 is then pushed to its foremost position to prevent the actuation of the reach rod 77 and the consequent movement of the conveyer 69. The device has now been converted from a loader to an ordinary hauling wagon as both the loader and distributer are out of service. The wagon is then driven to the place where it is desired to distribute the fertilizer and when this place is reached the latch lever 59 is moved forward to cause the chains 57 to engage the sprocket 64. This will actuate the beater as the distributer moves over the ground and at the same time the latch lever 75 is so adjusted that the material in the wagon is fed rearward to the beater at the desired speed, this operation being accomplished in the manner hereinbefore described.

When all of the material has been distributed the beater and conveyer 79 are again thrown out of action as previously described and the wagon returned for another load.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a device of the kind described, a wheel supported body, means to raise and lower one end thereof, a loader at the movable end, and a drive mechanism for said loader including a pair of members arranged to engage when the body is lowered and disengage when the body is raised.

2. In a device of the kind described, a wheel supported body, means to raise and lower one end thereof, a loader at the front end of said body, a conveyer supported on said loader, and a drive mechanism for said conveyer including a pair of members arranged to engage when the body is lowered and disengage when the body is raised.

3. In a device of the kind described, a wheel supported body, means to raise and lower one end thereof, a loader at the movable end of said body, a conveyer drum on the outer end of said loader, a second conveyer drum on the inner end of said loader, driving gears operatively connected to one of the wheels, driven gears operatively connected to the second drum, and elements on said driving and driven gears arranged to engage when the body is lowered and disengage when the body is raised.

4. In a device of the kind described, a body, wheels supporting the body, means to raise and lower said body, a conveyer carried by the body, actuating mechanism for said conveyer, and elements on one of said wheels adapted to contact with and operate the actuating mechanism.

5. In a device of the kind described, a conveyer actuating mechanism including a reciprocable reach rod, and means to vary the extent of reciprocation of said reach rod.

6. In a device of the kind described, a conveyer actuating mechanism including a reciprocable reach rod, resilient means to move said reach rod in one direction, a projection on said reach rod, and a stop adjacent the reach rod arranged to engage the projection and limit the movement of said reach rod by said resilient means, and mechanism to adjust the position of said stop.

7. In a device of the kind described, a conveyer actuating mechanism including a reciprocable reach rod, resilient means to move said reach rod in one direction, a projection on said reach rod, and a stop adjacent the reach rod arranged to engage the projection and limit the movement of said reach rod by said resilient means, and mechanism to adjust the position of said stop, said mechanism comprising a quadrant and a latch lever whereon said stop is carried.

8. In a device of the kind described, a conveyer actuating mechanism including a reciprocable reach rod, and means to vary the movement of said reach rod comprising a collar fixed on said reach rod, a sleeve slidably mounted on said reach rod, a latch lever supporting said sleeve, and a segment arranged for engagement by the latch of said latch lever.

9. In a device of the kind described, a conveyer actuating mechanism including a reciprocable reach rod and a spring to move said reach rod in one direction, and means to vary the movement of said reach rod comprising a collar fixed on said reach rod, a sleeve slidably mounted on said reach rod, a latch lever carrying said sleeve, and a segment arranged to be engaged by the latch of said latch lever.

10. In a device of the kind described, a body, wheels supporting the body, means to raise and lower one end of said body, a conveyer supported on said body, a pawl and ratchet mechanism for actuating said conveyer, a lever mounted on said body adjacent one of the wheels, said lever being at the movable end of the body, lugs on said wheel adapted to contact with and move said lever when the body is in its raised position, a reach rod connecting said lever with the pawl and ratchet mechanism to actuate the same as the lever is moved by said lugs, a spring for retracting the reach rod after movement by each of the lugs, a collar fixed on said reach rod, a sleeve slidable on the reach rod, a latch lever carrying said sleeve, and a quadrant adapted for engagement by the latch of said latch lever, said collar and sleeve being positioned to vary the movement of the reach rod as the same is retracted by the spring.

11. In a device of the kind described, an inverted U-shaped arch, wheels supporting said arch, a body having one end slidable vertically on said arch, and means to raise and lower said end.

12. In a device of the kind described, an inverted U-shaped arch, wheels supporting said arch, a body, guides secured to said body slidable vertically on said arch, and means to raise and lower said end.

13. In a device of the kind described, an inverted U-shaped arch, wheels supporting said arch, a body, guides secured to said body slidable vertically on said arch, and means to raise and lower said end, said means comprising racks formed on said arch, shafts supported on the sides of said arch, worms carried by said shafts and meshing with said racks, a horizontal shaft extending across said arch, bevel gears connecting said horizontal shaft with the first mentioned shafts, and a wheel fixed on the horizontal shaft to rotate the same.

14. In a device of the kind described, a wheel supported body, a loader fixed on one end thereof, a scoop pivoted at the outer end of said loader, a latch lever and quadrant on the inner end of said loader, and a link connecting the latch lever with the scoop to vary the angular positions of the scoop with reference to the loader as the latch lever is moved over the quadrant.

In testimony whereof, I affix my signature, in presence of two witnesses.

AUSTIN J. PARCELS.

Witnesses:
L. A. ACHTEN,
C. F. LIEBIG.